(No Model.)
J. W. BISHOP.
FIRE EXTINGUISHER.
No. 260,639. Patented July 4, 1882.
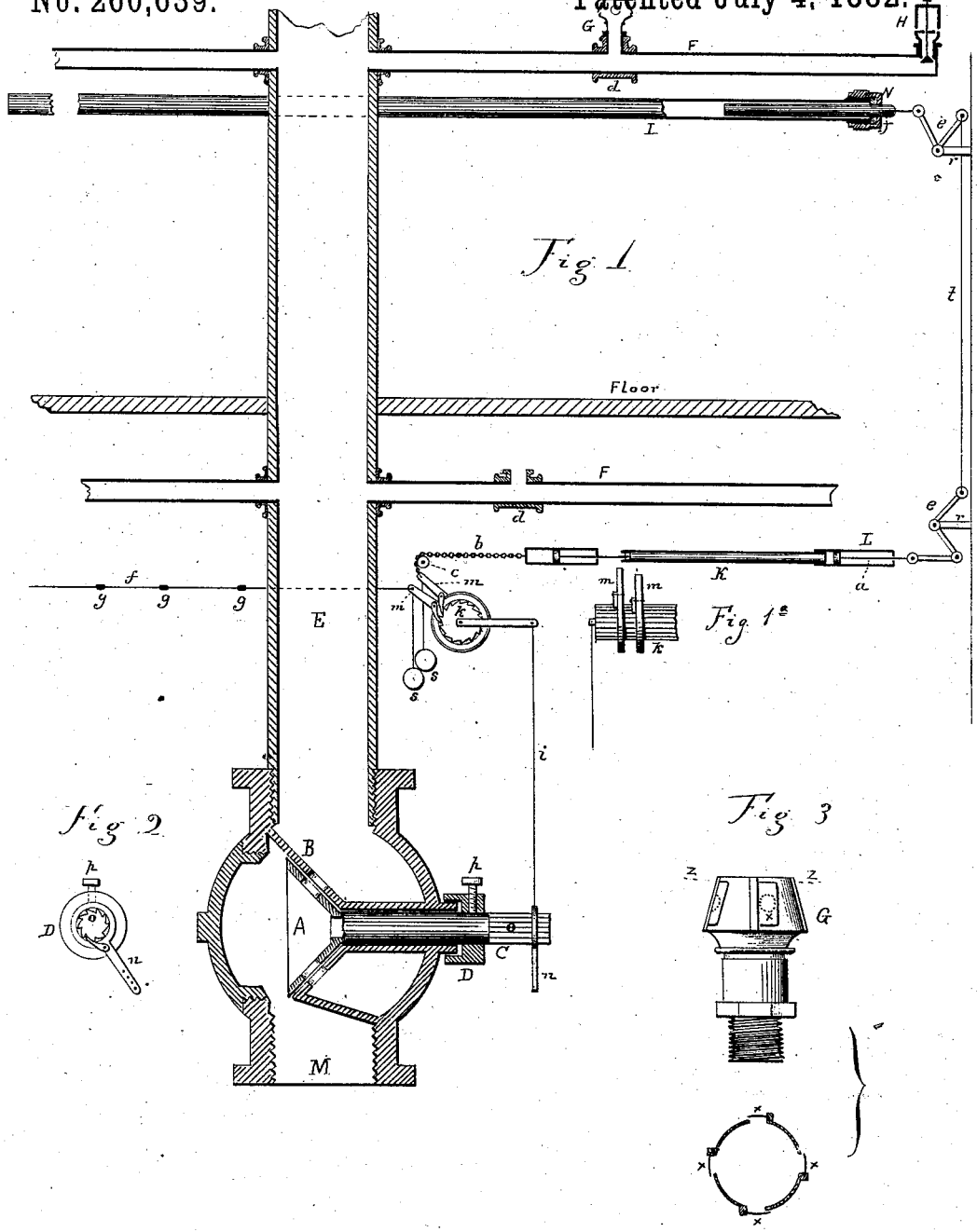

UNITED STATES PATENT OFFICE.

JOHN W. BISHOP, OF NEW HAVEN, CONNECTICUT, ASSIGNOR TO JOHN F. BISHOP, OF SAME PLACE.

FIRE-EXTINGUISHER.

SPECIFICATION forming part of Letters Patent No. 260,639, dated July 4, 1882.

Application filed May 11, 1881. (No model.)

*To all whom it may concern:*

Be it known that I, JOHN W. BISHOP, of New Haven, Connecticut, have invented a new and useful Improvement in Automatic Fire-Extinguishers, of which the following is a description.

My extinguisher belongs to that class which are provided with means for excluding the water from the building until it is needed, thus securing the building from any damage which might result from the leakage of any of the parts of the apparatus, and for automatically letting the water into the pipes within the building in case of fire to extinguish the same.

The invention consists of novel combinations and devices, as they are hereinafter more fully set forth and claimed.

In the annexed drawings, Figure 1 is a vertical section of the extinguisher; Fig. 1ª, a side view of the ratchet-shaft k; Fig. 2, an end view of one feature of the apparatus, and Fig. 3 views of a form of a distributer which I employ.

To enable others to make my extinguisher so that it will operate in the manner contemplated, I will describe it in detail.

M is the end of the water-supply valve, to which the source of water-supply is connected by a pipe.

B is a conical valve-seat, having openings through it, as shown in drawings, within which is the conical valve A, which rotates when used to afford or cut off the water-supply.

C is the stem of the valve A, having near its end the arm n, to which a connecting wire or rod is secured, having also the guide D, with the set-screw h in it to secure it in position, as may be required.

o shows the ratchet on the end, to which one or more arms may be connected, and is shown plainly in an end view. (See Fig. 2.)

E is the rising main pipe, to which are connected the branch pipes F, with which the fittings or branches d are connected.

G is a sprinkler or distributer of water, connected with the system of pipes, for the extinguishment of fire by being inserted into the fittings or branch outlets d.

H is an alarm-whistle, which is provided with a valve adapted to be closed by the water admitted into the pipe system. Said whistle is located at any convenient point in the pipe system, and is operated by atmospheric air in the pipes, which is driven out by the water admitted therein. When the water reaches the whistle it seats the valve located therein.

I is a releasing device, consisting of a tube filled with fluid, either air, gas, or liquid, and having within the tube the rod or piston J, which will move either outward or inward by the expansion or contraction of the fluid within the tube I.

N is a stuffing or packing box, by means of which a joint is made around the rod or piston J to prevent leakage or escape of the fluid contained in the tube I. The piston J is connected with the angle lever or arm e, the angle lever or arm being held in position by the rest or arm r.

L is a releasing device, consisting of a tube having within it the rod or wire a, with an enlarged end within the tube, which is intended to be fastened to the tube in such position as may be desired by an easily-fusible solder, and to be released from its fixed position by the action of heat. The rod or wire with the enlarged end is connected with the angle lever or arm e by a connecting-link of metal or wood. At the other end of the last-described releasing device is a connecting rod or link of cane, rattan, metal, or wood, (marked K,) to which is attached another releasing device like the one last described, having a chain at one end, which passes over a pulley or bearing, c, connecting with the arm m of the ratchet, the pawl or click of which matches into the ratchet shaft or arbor k, on which one or more arms may be placed. To the arm m a weight, s, is suspended by a wire.

G, Fig. 3, is an enlarged front view of the distributer, which is of the revolving class, and is made as shown by the drawings. The enlarged part, on which are the lines x, is hollow, with holes through its periphery, which communicate with the inside of the enlarged part of the revolving head, and thereby with the water-supply. Over said holes are thin plates of metal secured to the outside of the revolving head, being inserted into the projections, as shown. If desired, fins may be cast on the revolving head, to form part of the same and be bent over the holes which communicate with the inside of the revolving head and water-supply.

Wood or cane connecting links or rods, in connection with releasing devices, are to be used instead of wire, when necessary, to avoid action on the parts connected therewith, which would be the case in the use of metallic connections, in consequence of the expansion and contraction occasioned by variable temperatures.

My extinguisher, being constructed as described and connected with the water-supply, will operate as follows: The water will enter into the valve-chamber in which is the valve A and the valve-seat B, and be prevented from passing into the system of pipes until the ports or openings through the valve and valve-seat are brought opposite to each other, which will be accomplished by the heat acting upon one or more of the releasing devices as follows: First, the releasing device, consisting of the tube I, piston J, and the nut N, screwed onto the end of the tube I, whereby a tight joint is formed around the piston J, the other end of the tube being closed, and the space within the tube not occupied by the piston being filled with fluid in case of fire, will operate as follows: The fluid will expand by the absorption of heat, exerting a force against the end of the piston, forcing it outward, and the piston, being connected with one end of the angle-lever $e$, will communicate motion thereto, thereby releasing the tension on the connecting wire or link that connects the two angle-levers and the intermediate connections between the lower angle-lever and the upper arm, $m$, connected with the ratchet-shaft $k$, thus leaving the arm $m$ subject to the action of the weight $s$, which will descend, giving a rotary motion to the ratchet-shaft and the arm in connection therewith, said arm having one end of the connecting rod or link $i$ attached thereto, and the other end of the rod $i$, being attached to the arm $n$ on the valve-stem $c$, will rotate the valve A on its seat B until the perforations in the valve A and valve-seat B are opposite, when the water will be free to pass through the valve into the system of pipes and be discharged upon the fire and extinguish the same. When the fire is extinguished the temperature of the room will decrease and the fluid in the tube I will return to its original volume, and the piston will return to the position it occupied before the fire occurred and the increase in temperature took place by the pressure of the atmosphere upon it, carrying with it the connecting-rods, and the other parts forming the connection between it and the valve A, thereby turning the valve A in its seat B until the flow of water is stopped and further damage by water prevented.

The arm $n$ on the valve-stem $c$ may be without the ratchet and be permanently fastened to the valve-stem. A weight may be attached to the arm $n$ when required. A spring or weight, or their equivalent, may be used as an auxiliary means for forcing the piston back, in addition to the atmospheric pressure.

The releasing device marked L consists of a tube or guide, (represented by L,) and a piston or sliding piece, $a$, with one of its ends enlarged, the other end passing through or beyond the end of the guide and being connected with one end of the angle-lever $e$ by means of a link. The enlarged end of the piston or sliding piece is to be soldered by an easily-fusible material to the tube or guide near the end to which the connecting-rod K is attached. The tube or guide has a rim projecting inward, through which the piston or sliding piece passes, said rim forming a limit of motion for the two parts.

The operation is as follows: The device having been placed in a building, near the ceiling, and a fire occurring, the temperature will be increased until it reaches, for instance, 160°, when the solder by which one part of the device is held to the other part will fuse, releasing the two parts from a fixed position, leaving the tube or guide L and the intermediate connections between it and the arm $m$, attached to the ratchet-shaft $k$, to the action of the weight $s$, which will descend, drawing along with it said intermediate connections, and the tube or guide will be drawn over or along the enlarged end of the piston $a$ until the enlarged end is brought in contact with the rim or projection on the inside of the tube or guide L, thereby preventing further motion. The weight $s$, in connection with the arm $m$ and the ratchet-shaft $k$, carrying the arm to which the rod or wire $i$ is attached, said wire $i$ being also connected by one of its ends to the arm $n$ on the valve-stem $c$, will, by the motion imparted by the descent of the weight, rotate the valve A in its seat B, bringing the perforations in said valve and its seat opposite, when the water will be permitted to flow into the system of pipes.

Instead of the tube L containing the piston or rod with the enlarged end, releasing devices can be used made of two or more parts—as, for instance, two or more links of chain, one link fastened to another link by an easily-fusible solder in such a manner that when the solder is fused the chain will lengthen out, or a releasing device made of two pieces of metal, one part forming a yoke or way, within or along which one part may be drawn along, within, or on the surface of the other part to a limited extent only.

Having described my improved extinguisher and its mode of operation, what I claim as new, and desire to secure by Letters Patent, is—

1. In fire-extinguishers, a rotating valve the spindle of which is provided with grooves or ratchet-teeth at its outer end, in combination with one or more ratchet-arms, substantially as and for the purpose set forth.

2. In fire-extinguishers, a supply-valve consisting of the perforated conical valve A, and the perforated conical seat B, and stem C, provided with grooves or ratchet $o$ at its outer end, in combination with the guide D and ratchet-arm $n$, substantially as set forth.

3. In fire-extinguishers, the perforated valve A, having the stem C, which carries the arm $n$ on its outer end, the guide D, and perforated valve-seat B, in combination with one or more releasing devices holding in a suspended and fixed position one or more weights, whereby the valve is opened for the passage of water to the pipe system when the releasing devices are affected by the requisite degree of heat, substantially as and for the purpose set forth.

4. In fire-extinguishers, the shaft $k$, provided with grooves or ratchet-teeth, and with a device which communicates the motion of the shaft to a link or rod, and arms $m$, with pawls, in combination with the valve-spindle having arm or arms $m$, substantially as and for the purpose set forth.

5. In fire-extinguishers, the grooved shaft $k$, having a device which communicates the motion of the shaft to a link or links which connect with the valve-spindle, in combination with arms and pawls $m$, and means for automatically operating said arms $m$ when the surrounding temperature has exceeded a certain degree, substantially as described.

6. In fire-extinguishers, the combination, with means for letting on the water-supply upon the fusing of a soldered joint, of connecting-links of wood or cane between the soldered joints, substantially as set forth.

7. In combination with a system of fire-extinguishing pipes from which the water is excluded until a fire occurs, a whistle located at any convenient point in the pipe system, operated by the air in the pipes which is forced out by the admission of the water-supply, and provided with a valve to prevent the escape of water therethrough, substantially as described.

8. In fire-extinguishers, a releasing mechanism consisting of two or more parts not separable in action, one fitting within another, and retained in a fixed position by means adapted to release the parts from such position by the absorption of heat, whereby, upon the requisite increase in temperature, the movement of the parts will cause the operating devices to open the water-supply, substantially as shown and set forth.

9. In fire-extinguishers, a releasing device consisting of a piston, J, and a tube, I, one end of said tube being closed, while the other end thereof is provided with a packing-joint to prevent leakage, said tube being adapted to receive a fluid or gas capable of expansion under heat, whereby as the fluid or gas expands the piston is forced out of the containing tube, substantially as and for the purpose set forth.

JOHN W. BISHOP.

Witnesses:
R. ELMER GOODRICH,
IRVING L. BASSETT.